United States Patent
Kang et al.

(10) Patent No.: US 10,812,841 B2
(45) Date of Patent: Oct. 20, 2020

(54) APPARATUS FOR ENCODING AND TRANSCODING WHICH APPLIES MULTI-FORMAT ULTRA-HIGH DEFINITION HIGH-EFFICIENCY CODEC

(71) Applicant: CASTWIN CO., LTD., Seoul (KR)

(72) Inventors: Il-Seok Kang, Seoul (KR); Young-Han Yang, Seoul (KR)

(73) Assignee: CASTWIN CO., LTD., Seoul (KR)

( * ) Notice: Subject to any disclaimer, the term of this patent is extended or adjusted under 35 U.S.C. 154(b) by 500 days.

(21) Appl. No.: 15/746,460

(22) PCT Filed: Nov. 20, 2015

(86) PCT No.: PCT/KR2015/012516
§ 371 (c)(1),
(2) Date: Jan. 22, 2018

(87) PCT Pub. No.: WO2017/014366
PCT Pub. Date: Jan. 26, 2017

(65) Prior Publication Data
US 2018/0220175 A1    Aug. 2, 2018

(30) Foreign Application Priority Data

Jul. 23, 2015 (KR) ........................ 10-2015-0104480

(51) Int. Cl.
| | | |
|---|---|---|
| H04N 21/2343 | (2011.01) | |
| H04N 7/015 | (2006.01) | |
| H04N 21/2381 | (2011.01) | |
| H04N 21/234 | (2011.01) | |
| H04N 21/643 | (2011.01) | |
| H04N 21/845 | (2011.01) | |
| H04N 19/44 | (2014.01) | |
| H04N 19/91 | (2014.01) | |
| H04N 19/61 | (2014.01) | |

(52) U.S. Cl.
CPC ..... *H04N 21/234309* (2013.01); *H04N 7/015* (2013.01); *H04N 19/45* (2014.11); *H04N 19/91* (2014.11); *H04N 21/234* (2013.01); *H04N 21/2343* (2013.01); *H04N 21/2381* (2013.01); *H04N 21/64322* (2013.01); *H04N 21/8451* (2013.01); *H04N 19/61* (2014.11)

(58) Field of Classification Search
None
See application file for complete search history.

(56) References Cited

FOREIGN PATENT DOCUMENTS

| | | |
|---|---|---|
| JP | 2006-209841 | 8/2006 |
| JP | 2010-028642 | 2/2010 |
| JP | 2014-204331 | 10/2014 |
| KR | 100765193 | 10/2007 |

(Continued)

*Primary Examiner* — Chan S Park
*Assistant Examiner* — Elisa M Rice
(74) *Attorney, Agent, or Firm* — IPLA P.A.; James E. Bame

(57) ABSTRACT

Provided is an apparatus for encoding and transcoding which applies a multi-format ultra-high definition high-efficiency codec, the apparatus being capable of encoding and transcoding, in one codec apparatus, uncompressed ultra-high definition broadcast content and compressed ultra-high definition broadcast content as ultra-high definition digital broadcast signals, and also being capable of transmitting the encoded digital broadcast signals in various transmission formats such as ASI and IP streams.

6 Claims, 2 Drawing Sheets

(56) References Cited

FOREIGN PATENT DOCUMENTS

| | | |
|---|---|---|
| KR | 1020140056600 | 5/2014 |
| KR | 101421201 | 7/2014 |
| KR | 1020150027530 | 3/2015 |

APPARATUS FOR ENCODING AND TRANSCODING WHICH APPLIES MULTI-FORMAT ULTRA-HIGH DEFINITION HIGH-EFFICIENCY CODEC

BACKGROUND

The present invention relates to an encoding and transcoding apparatus which applies a multi-format ultra-high definition high-efficiency codec and can encode and transcode, in one codec apparatus, uncompressed ultra-high definition broadcast content and compressed ultra-high definition broadcast content into ultra-high definition digital broadcast signals and transmit the encoded digital broadcast signals in various transmission formats such as ASI and IP streams.

With the development of broadcast technology, conventional analog broadcasting comes to an end and digital broadcasting having high broadcast quality and capable of transmitting broadcast along with various types of information is rapidly propagated. Recently, ultra-high definition (UHD) digital broadcasting has started test broadcasting.

Meanwhile, to provide digital data transport streams required for UHD digital broadcasting, broadcasting equipment, such as an encoder and a transcoder, plays an important role.

Accordingly, high-efficiency video coding (HEVC) approved as the H.265 standard in ITU-T is being actively developed. HEVC provides compression performance more than twice the conventional compression performance while having low loss.

Accordingly, various HEVC techniques such as Korean Patent Application No. 2014-0056600 "HEVC lossless level coding method and apparatus" and Korean Patent Application No. 2015-0027530 "HEVC coding apparatus and coding method using the same" are proposed.

However, conventional systems cannot process uncompressed digital broadcast content as well as compressed digital broadcast content using one HEVC transcoder and cannot provide input/output in various formats including DVB-AVI and IP streams.

Furthermore, broadcasters transmit broadcast using a decoder, an encoder and a transcoder with the aforementioned problem. In this case, costs for broadcasting equipment increase and efficient management of broadcast equipment or programs is difficult to perform.

Prior Art Document (Patent document 1) Korean Patent Application No. 2014-0056600 "HEVC lossless level coding method and apparatus"

(Patent document 2) Korean Patent Application No. 2015-0027530 "HEVC coding apparatus and coding method using the same"

SUMMARY OF THE INVENTION

The present invention devised to solve the aforementioned problem provides an encoding and transcoding apparatus using a multi-format ultra-high definition high-efficiency codec, which can encode, in one codec apparatus, uncompressed broadcast content and compressed broadcast content into digital broadcast signals and transmit the encoded digital broadcast signals in ASI and IP streams.

To this end, an encoding and transcoding apparatus using a multi-format ultra-high definition high-efficiency codec according to the present invention includes: an uncompressed broadcast signal processor for receiving an uncompressed video signal and audio signal among broadcast content and processing the uncompressed video signal and audio signal; a compressed broadcast signal processor for receiving a compressed video signal and audio signal among broadcast content and decoding the compressed video signal and audio signal; a multi-audio encoder for receiving the audio signal processed in the uncompressed broadcast signal processor and the audio signal decoded in the compressed video signal processor and encoding the audio signals; an HEVC encoder for encoding the video signal processed in the uncompressed broadcast signal processor and the video signal decoded in the compressed broadcast signal processor in HEVC format to provide a digital broadcast transport stream; an ASI processor for receiving the transport stream provided by the HEVC encoder, converting the transport stream into a DVB-ASI signal and outputting the DVB-ASI signal; and an output IP converter for converting the DVB-ASI signal provided by the ASI processor into an IP packet and outputting the IP packet.

Preferably, the encoding and transcoding apparatus using a multi-format ultra-high definition high-efficiency codec may further include a TS processor for combining the transport stream provided by the HEVC encoder with a transport stream provided by external PSIP and providing the combined transport streams to the ASI processor.

Preferably, the uncompressed broadcast signal processor may include: an SDI processor for receiving broadcast content in SDI format and separating the broadcast content into a video signal and an I2S audio signal; an HDMI processor for receiving broadcast content in HDMI format and separating the broadcast content into a video signal and an I2S audio signal; and a video processor for selecting one of the video signals output from the SDI processor and the HDMI processor and providing the selected signal to the HEVC encoder, wherein the I2S audio signal output from the SDI processor or the I2S audio signal output from the HDMI processor is provided to the multi-audio encoder.

Preferably, the uncompressed broadcast signal processor may include: an analog audio converter for receiving an analog audio signal, converting the analog audio signal into an I2S audio signal and providing the I2S audio signal to the multi-audio encoder; and a digital audio receiver for receiving an AES/EBU signal or an SPDIF signal, converting the received signal into an I2S audio signal and providing the I2S audio signal to the multi-audio encoder.

Preferably, the compressed broadcast signal processor may include: an input IP converter for extracting a transport stream from an input IP packet and converting the transport stream extracted from the IP packet into a DVB-ASI signal; a PID conversion unit for selecting one of programs included in MPTS, adding a PID of the selected program to the DVB-ASI signal provided by the input IP converter and converting the DVB-ASI signal having the PID added thereto into a transport stream; and a decoder unit for decoding a video signal and an audio signal included in the transport stream provided by the PID conversion unit, providing the decoded audio signal to the multi-audio encoder and providing the decoded video signal to the HEVC encoder.

Preferably, the input IP converter includes a process of receiving an IP packet in JPEG or an IP packet in ProRes422 and extracting a transport stream from the IP packet, the PID conversion unit includes a process of extracting a transport stream selected between a transport stream in JPEG and a transport stream in ProRes422, and the decoder unit includes a JPEG2000 decoder for decoding JPEG signals and a ProRes422 decoder for decoding ProRes422 signals.

As described above, the present invention encodes an uncompressed signal using an HEVC encoder after processing the signal and encodes a compressed signal using the HEVC encoder after decoding the signal. In addition, the present invention converts the encoded signals into DVB-ASI and IP packets and outputs the DVB-ASI and IP packets.

Accordingly, various inputs and outputs are selectively provided using one broadcast apparatus, and thus costs for broadcast equipment can be reduced and efficient management of broadcast equipment or programs can be achieved.

DETAILED DESCRIPTION OF THE INVENTION

Hereinafter, an encoding and transcoding apparatus using a multi-format ultra-high definition codec according to a preferred embodiment of the present invention will be described in detail with reference to the attached drawings.

Figure 1:
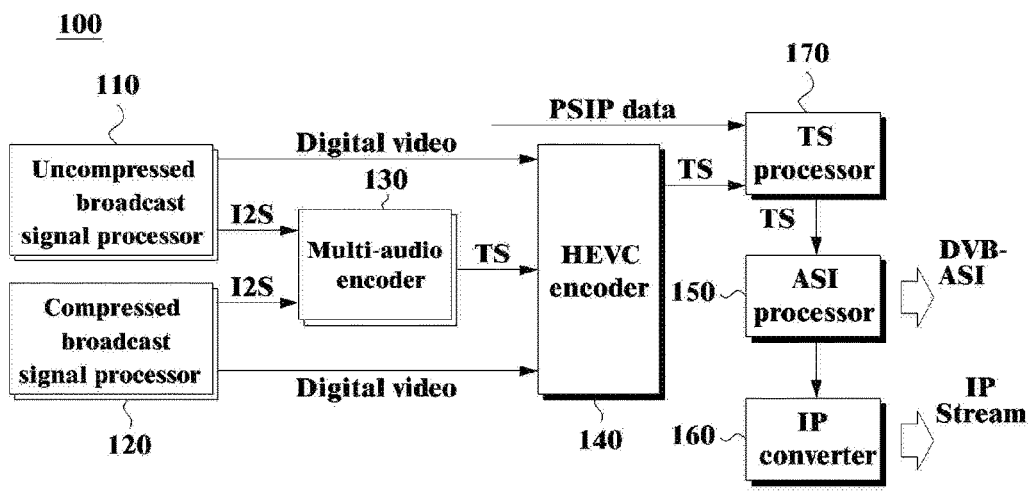
FIG. 1 is a schematic diagram illustrating an encoding and transcoding apparatus using a multi-format ultra-high definition codec according to the present invention.

As shown in FIG. 1, an encoding and transcoding apparatus 100 using a multi-format ultra-high definition codec according to the present invention includes an uncompressed broadcast signal processor 110, a compressed broadcast signal processor 120, a multi-audio encoder 130, an HEVC encoder 140, an ASI processor 150, an output IP converter 160 and a TS processor 170.

The uncompressed broadcast signal processor 110 and the compressed broadcast signal processor 120 process input broadcast content according to whether the broadcast content has been compressed and provide a video signal and an audio signal to the multi-audio encoder 130 and the HEVC encoder 140.

In addition, the multi-audio encoder 130 and the HEVC encoder 140 respectively encode the video signal and the audio signal provided thereto to generate a digital broadcast transport stream (TS) and provide the digital broadcast transport stream to the ASI processor 150, the output IP converter 160 and the TS processor 170.

The ASI processor 150 converts the transport stream into a DVB-ASI signal and transmits the DVB-ASI signal, and the output IP converter 160 converts the DVB-ASI signal into an IP packet and transmits the IP packet. The TS processor 170 adds PSIP information to the transport stream and provides the transport stream having the PSIP information to the ASI processor 150 as necessary.

The present invention encodes an uncompressed signal using the HEVC encoder 140 and encodes (i.e., transcodes) a compressed signal after decoding the compressed signal using one transcoder. In addition, the present invention converts the encoded or transcoded signals into DVB-ASI or IP packets and outputs the packets.

Accordingly, the present invention selectively provides various inputs and outputs using one broadcast apparatus to reduce costs for UHD broadcast equipment and achieve efficient management of broadcast equipment or programs.

More specifically, the uncompressed signal processor 110 receives and processes an uncompressed video signal and audio signal such as 4K or 8K SDI, 4K or 8K HDMI, analog audio, AES/EBU and SPDIF among broadcast content, for example.

Signal processing in the uncompressed broadcast signal processor 110 serves to process a signal into data suitable for encoding and enables the multi-audio encoder 130 for audio signals and the HEVC encoder 140 for video signal to encode signals.

Accordingly, the uncompressed broadcast signal processor 110 provides the processed audio signal in the I2S format to the multi-audio encoder 130 and provides the processed video signal in a digital video format to the HEVC encoder 140.

The compressed broadcast signal processor 120 receives and decodes a video signal and audio signal compressed in 4K or 8K JPEG-2000 and 4K or 8K ProRes 422 among broadcast content, for example.

The compressed broadcast signal processor 120 decodes compressed broadcast content and transcodes the compressed broadcast content such that the multi-audio encoder 130 and the HEVC encoder 140 can encode the compressed broadcast content.

Accordingly, the compressed broadcast signal processor 120 provides the decoded audio signal in the I2S format to the multi-audio encoder 130 and provides the decoded video signal in the digital video format to the HEVC encoder 140.

The multi-audio decoder 130 receives the audio signal processed in the uncompressed broadcast signal processor 110 and the audio signal decoded in the compressed broadcast signal processor 120 and encodes the audio signals.

The multi-audio encoder 130 encodes the audio signals in the I2S format included in the compressed broadcast content and the uncompressed broadcast content using one audio encoder to provide a transport stream (TS).

The HEVC encoder 140 encodes the video signal processed in the uncompressed broadcast signal processor 110 and the video signal decoded in the compressed broadcast signal processor 120 in the 4K or 8K HEVC format.

That is, the HEVC encoder 140 encodes the video signals in the digital video format included in the compressed broadcast content and the uncompressed broadcast content using one video encoder to provide a transport stream (TS).

For example, the HEVC encoder 140 serves as an encoder and a transcoder which provide digital data transport streams required for 4K or 8K UHD digital broadcasting.

Figure 2:
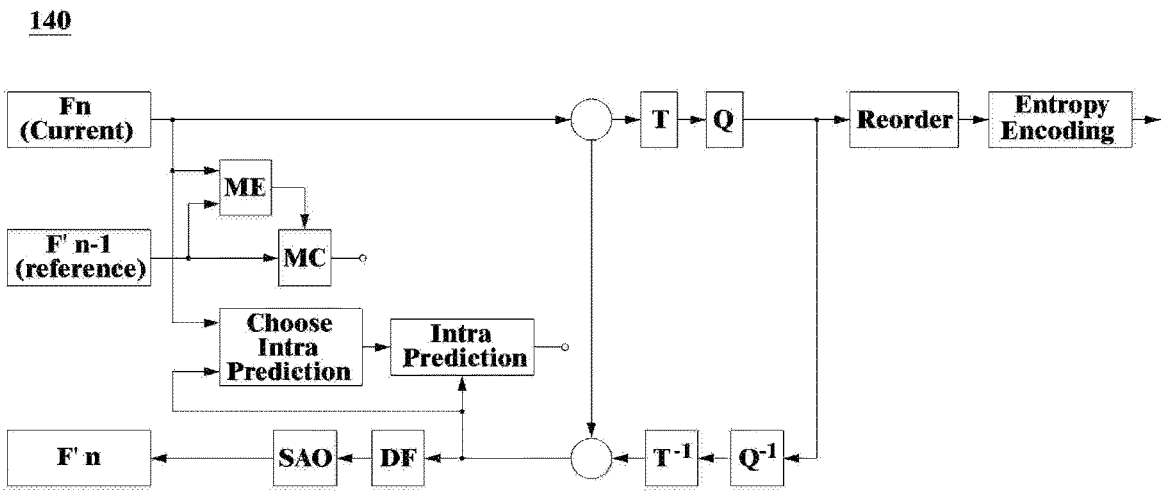
FIG. 2 is a schematic diagram illustrating an HEVC encoder applicable to the present invention.

As shown in FIG. 2, the 4K or 8K HEVC encoder 140 performs predictive coding using correlation between frames $F_n$ and $F_{n-1}$ in an intra mode and an inter mode.

To this end, the HEVC encoder 140 includes a transformation unit T, a quantization unit Q, an entropy encoder, an inverse transformation unit $T^{-1}$, an inverse quantization unit $Q^{-1}$, a switch P, a motion estimation unit ME, a motion compensation unit MC and a choose intra-prediction unit.

The algorithm of the HEVC encoder 140 is known, and the HEVC encoder 140 disclosed in various documents including Korean Patent Application No. 2013-0078319 and Korean Patent Application No. 2015-0032258 can be applied to the present invention.

The ASI processor 150 receives the transport stream provided by the HEVC encoder 140, converts the transport stream into a DVB-ASI signal and outputs the DVB-ASI signal. The transport stream provided by the HEVC encoder 140 includes the transport stream of the multi-audio encoder 130.

DVB-ASI (Digital Video Broadcasting-Asynchronous Serial interface) refers to serial digital broadcast transport streams, and the present invention provides ASI transmission as one of various output formats.

The output IP converter 160 converts the DVB-ASI signal provided by the ASI processor 150 into an IP (Internet Protocol) packet and outputs the IP packet. The output IP converter 160 adds UDP or IP to a transport stream and transmits the transport stream as an IP stream.

Accordingly, the present invention provides output in an IP stream in addition to the aforementioned output in the DVB-ASI format, and thus UHD digital broadcasting can be provided in any digital TV or IP communication environment.

The TS processor 170 combines a transport stream provided by external PSIP with the transport stream provided by the HEVC encoder 140 and provides the combined transport streams to the ASI processor 150.

PSIP (Program and System Information Protocol) includes programs or data transmitted in a digital TV and various types of information necessary for TV reception, and the TS processor 170 multiplexes transport streams input thereto.

In addition, the TS processor 170 has a function of setting a total bit rate and a function of generating PAT/PMT/PSIP/SI.

Hereinafter, the above-described encoding and transcoding apparatus using a multi-format ultra-high definition high-efficiency codec according to the present invention will be described in more detail through a specific embodiment.

Figure 3:
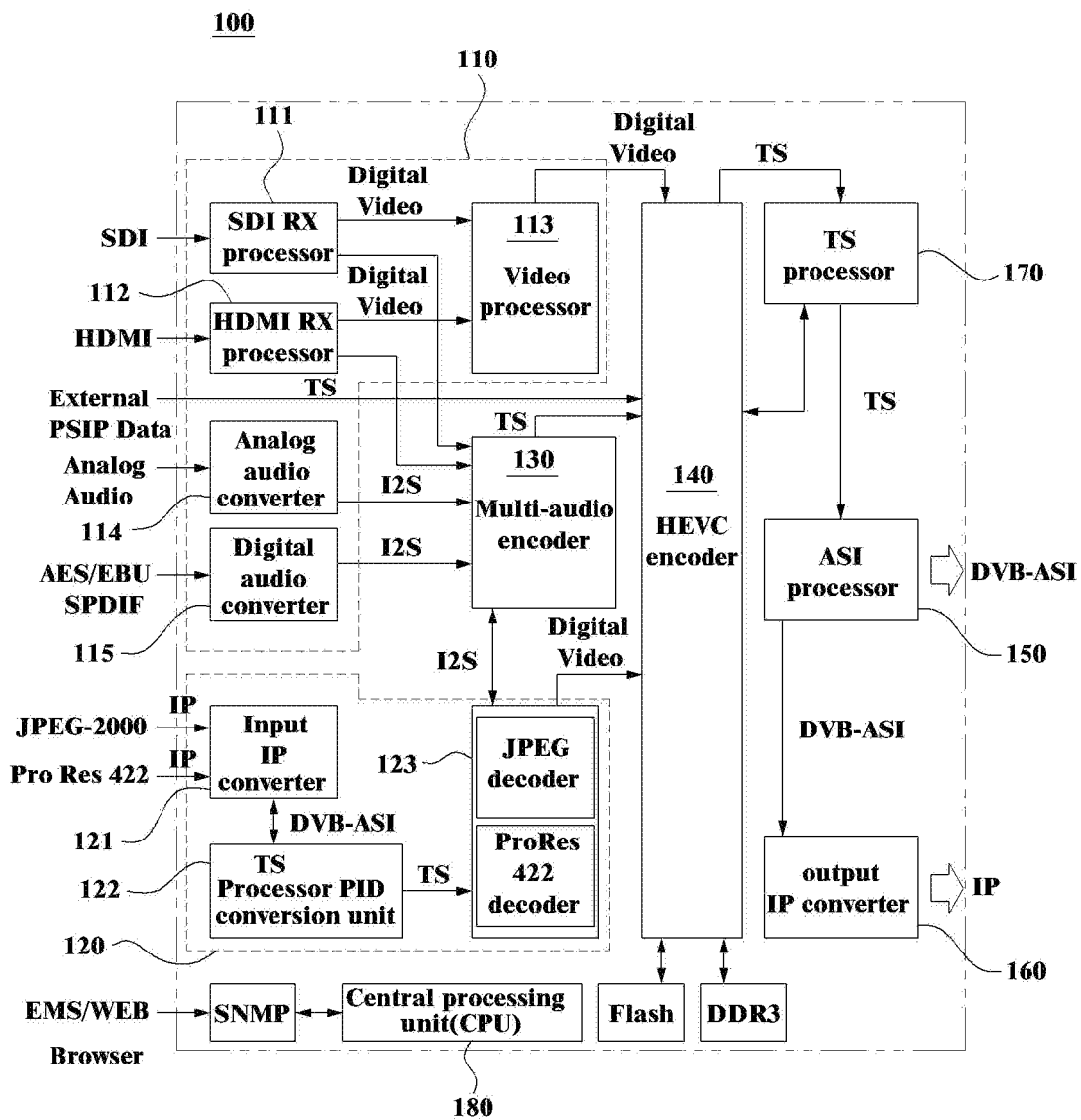
FIG. 3 is a diagram illustrating a specific embodiment of the encoding and transcoding apparatus using a multi-format ultra-high definition codec according to the present invention.

As shown in FIG. 3, the uncompressed broadcast signal processor 110 includes an SDI processor 111, an HDMI processor 112 and a video processor 113. In another embodiment, the uncompressed broadcast signal processor 110 further includes an analog audio converter 114 and a digital audio receiver 115.

Here, the SDI processor 111 receives broadcast content in the 4K or 8K SDI (Serial Digital Interface) format and separates the broadcast content into a video signal (digital video) and an I2S (Integrated Interchip Sound) audio signal.

The aforementioned SDI signal corresponds to uncompressed broadcast content, and is provided through, for example, a plurality of 3G HD-SDI input lines or a single SDI input line and switched at a high speed to provide parallel video and audio outputs.

Outputs of the SDI processor 111 are separated (demultiplexed) into video and audio, digital video is provided to the video processor 113 and the I2S audio signal (i.e., sound) is provided to the multi-audio encoder 130.

For example, the HDMI processor 112 receives broadcast content in the HDMI (High Definition Multimedia Interface) format and separates the broadcast content into a video signal (digital video) and an I2S audio signal.

HDMI is an interface standard for combining and transmitting digital video and audio signals and corresponds to uncompressed broadcast content along with analog audio, AES/EBU and SPDIF which will be described later.

Outputs of the HDMI processor 112 are separated (demultiplexed) into video and audio, digital video is provided to the video processor 113 and the I2S audio signal is provided to the multi-audio encoder 130.

The video processor 113 selects one of the video signal output from the SDI processor 111 and the video signal output from the HDMI processor 112 and provides the selected video signal to the HEVC encoder 140. Accordingly, both the 4K or 8K SDI signal and HDMI signal can be processed.

In addition, the video processor 113 controls timing, improves jitter and performs interfacing such that the video signal (digital video) selected as above is processed by the HEVC encoder 140.

Although not described above, the I2S audio signal output from the SDI processor 111 and the I2S audio signal output from the HDMI processor 112 are provided to the multi-audio encoder 130 and encoded therein.

External PSIP data corresponds to a compressed signal and provides PSIP which is associated with an external interface to provide channel setting and program information to the ASI processor 150.

The analog audio converter 114 receives an analog audio signal and converts the analog audio signal into a digital I2S audio signal. The converted digital audio signal is provided to the multi-audio encoder 130, and the multi-audio encoder 130 encodes the converted digital audio signal.

The digital audio receiver 115 selectively receives an AES/EBU signal and an SPDIF signal (optical audio signal), converts the selected signal into an I2S audio signal and provides the I2S audio signal to the multi-audio encoder 130.

Here, AES/EBU (Audio Engineering Society/European Broadcasting Union) and SPDIF (Sony/Philips Digital Interface, IEC958-TYPE) are used as digital outputs for expert or home use.

Accordingly, the present invention selectively processes AES/EBU and SPDIF through one digital audio receiver 115 to convert the same into an I2S audio signal and encodes the I2S audio signal through the multi-audio encoder 130.

The compressed broadcast signal processor 120 includes an input IP converter 121, a PID conversion unit 122 and a decoder unit 123. The decoder unit 123 is composed of a JPEG2000 decoder and a ProRes 422 decoder which will be described later.

Here, the input IP converter 121 extracts a transport stream carried in an IP packet input in the IP stream format. In addition, the input IP converter 121 converts the transport stream extracted from the IP packet into a DVB-ASI signal.

For example, the input IP converter 121 receives broadcast content compressed in JPEG such as 4K or 8K JPEG-2000 and processes the broadcast content. The processed transport stream is decoded by the JPEG2000 decoder as will be described below.

The PID conversion unit 122 selects one of programs included in multi-program transport streams (MPTS) and adds the PID (Program ID) of the selected program to the DVB-ASI signal provided by the IP converter. Programs that are not selected are dropped.

PID indicates channel or program information used in digital broadcasting and includes PAT/PMT/Videp/Audio. Routing is performed using a program number instead of PID as necessary.

An integrated signal obtained by adding the PID to the DVB-ASI signal provided by the input IP converter 121 is converted into one transport stream in the PID conversion unit 122, provided to the decoder unit 123 and decoded therein.

The decoder unit 123 decodes the video signal and the audio signal included in the transport stream provided by the PID conversion unit 122, provides the decoded I2S audio signal to the multi-audio encoder 130 and provides the decoded video signal to the HEVC encoder 140.

This is for the purpose of decoding compressed broadcast content to decompress the broadcast content and transcoding the broadcast content in the HEVC encoder 140. For example, the decoder unit 123 includes a 4K or 8K JPEG2000 decoder and a ProRes 422 decoder.

Accordingly, when broadcast content compressed in JPEG-2000 is input through the input IP converter 121, a transport stream is extracted from an IP packet and converted into a DVB-ASI signal, and the PID conversion unit 122 adds a PID to the DVB-ASI signal to convert the DVB-ASI signal into a transport stream and provide the transport stream to the JPEG2000 decoder.

When broadcast content compressed in 4K or 9K ProRes 422 format is input through the input IP converter 121, a transport stream is extracted from an IP packet and converted into a DVB-ASI signal, and the PID conversion unit 122 adds a PID to the DVB-ASI signal to convert the DVB-ASI signal into a transport stream and then provide the transport stream to the ProRes 422 decoder.

To this end, the PID conversion unit 122 needs to further have a process function of extracting a transport stream from an IP packet in addition to the aforementioned function of adding a PID.

The transport stream extraction functions of the input IP converter 121 and the PID conversion unit 122 may be integrated and the input IP converter 121 and the PID conversion unit 122 may be implemented in one chipset (IC).

A central processing unit (CPU) 180, which is not described above, sets and manages the HEVC encoder 140, input/output of IP packets and functions of the aforementioned other components of the present invention.

The CPU 180 may further have an SNMP (Simple Network Management Protocol) control function to interoperate with an EMS (Enterprise Management System) or a web browser as necessary.

Although the invention has been described with reference to the exemplary embodiments, those skilled in the art will appreciate that various modifications and variations can be made in the present invention without departing from the spirit and scope of the invention described in the appended claims.

Therefore, the above embodiments are provided to inform those skilled in the art of the scope of the present invention and thus are construed in all aspects as illustrative and not restrictive, and the scope of the invention should be determined by the appended claims.

The invention claimed is:

1. An encoding and transcoding apparatus using a multi-format ultra-high definition high-efficiency codec, comprising:
   an uncompressed broadcast signal processor for receiving an uncompressed video signal and audio signal among broadcast content and processing the uncompressed video signal and audio signal;
   a compressed broadcast signal processor for receiving a compressed video signal and audio signal among broadcast content and decoding the compressed video signal and audio signal;
   a multi-audio encoder for receiving the audio signal processed in the uncompressed broadcast signal processor and the audio signal decoded in the compressed video signal processor and encoding the audio signals;
   an HEVC (High-Efficiency Video Coding) encoder for encoding the video signal processed in the uncompressed broadcast signal processor and the video signal decoded in the compressed broadcast signal processor in HEVC format to provide a digital broadcast transport stream;
   an ASI (Asynchronous Serial Interface) processor for receiving the transport stream provided by the HEVC encoder, converting the transport stream into a DVB-ASI (Digital Video Broadcasting-Asynchronous Serial Interface) signal and outputting the DVB-ASI signal; and
   an output IP (Internet Protocol) converter 160 for converting the DVB-ASI signal provided by the ASI processor into an IP packet and outputting the IP packet.

2. The encoding and transcoding apparatus using a multi-format ultra-high definition high-efficiency codec according to claim 1, further comprising a TS processor for combining the transport stream provided by the HEVC encoder with a transport stream provided by external PSIP (Program and System Information Protocol) and providing the combined transport streams to the ASI processor.

3. The encoding and transcoding apparatus using a multi-format ultra-high definition high-efficiency codec according to claim 1, wherein the uncompressed broadcast signal processor comprises:
   an SDI (Selective Dissemination of Information) processor for receiving broadcast content in 3G-SDI (Serial Digital Interface) format and separating the broadcast content into a video signal and an I2S (Integrated Interchip Sound) audio signal;
   an HDMI (High Definition Multimedia Interface) processor for receiving broadcast content in HDMI format and separating the broadcast content into a video signal and an I2S audio signal; and
   a video processor for selecting one of the video signals output from the SDI processor and the HDMI processor and providing the selected signal to the HEVC encoder,
   wherein the I2S audio signal output from the SDI processor or the I2S audio signal output from the HDMI processor is provided to the multi-audio encoder.

4. The encoding and transcoding apparatus using a multi-format ultra-high definition high-efficiency codec according to claim 3, wherein the uncompressed broadcast signal processor comprises:
   an analog audio converter for receiving an analog audio signal, converting the analog audio signal into an I2S audio signal and providing the I2S audio signal to the multi-audio encoder; and
   a digital audio receiver for receiving an AES/EBU (Audio Engineering Society/European Broadcasting Union) signal or an SPDIF (Sony/Philips Digital Interface) signal, converting the received signal into an I2S audio signal and providing the I2S audio signal to the multi-audio encoder.

5. The encoding and transcoding apparatus using a multi-format ultra-high definition high-efficiency codec according to claim 1, wherein the compressed broadcast signal processor comprises:
   an input IP converter for extracting a transport stream from an input IP packet and converting the transport stream extracted from the IP packet into a DVB-ASI signal;
   a PID (Program ID) conversion unit for selecting one of programs included in MPTS (multi-program transport streams), adding a PID of the selected program to the DVB-ASI signal provided by the input IP converter and converting the DVB-ASI signal having the PID added thereto into a transport stream; and a decoder unit for decoding a video signal and an audio signal included in the transport stream provided by the PID conversion unit, providing the decoded audio signal to the multi-audio encoder and providing the decoded video signal to the HEVC encoder.

6. The encoding and transcoding apparatus using a multi-format ultra-high definition high-efficiency codec according to claim 5, wherein the input IP converter includes a process of receiving an IP packet in JPEG (Joint Photographic coding Experts Group) or an IP packet in ProRes422 and extracting a transport stream from the IP packet, the PID conversion unit includes a process of extracting a transport stream selected between a transport stream in JPEG and a transport stream in ProRes422, and the decoder unit includes a JPEG2000 decoder for decoding JPEG signals and a ProRes422 decoder for decoding ProRes422 signals.

* * * * *